US008416441B2

(12) United States Patent
Tian

(10) Patent No.: US 8,416,441 B2
(45) Date of Patent: Apr. 9, 2013

(54) SCAN DATA WORKFLOW PROCESSING

(75) Inventor: Lifen Tian, Sunnyvale, CA (US)

(73) Assignee: Ricoh Company, Ltd, Tokyo (JP)

( * ) Notice: Subject to any disclaimer, the term of this patent is extended or adjusted under 35 U.S.C. 154(b) by 734 days.

(21) Appl. No.: 12/560,590

(22) Filed: Sep. 16, 2009

(65) Prior Publication Data

US 2011/0063655 A1   Mar. 17, 2011

(51) Int. Cl.
*G06F 3/12* (2006.01)
*G06F 15/00* (2006.01)
*G06K 1/00* (2006.01)

(52) U.S. Cl. .......... 358/1.15; 358/474; 358/1.1; 358/1.2

(58) Field of Classification Search .......... None
See application file for complete search history.

(56) References Cited

U.S. PATENT DOCUMENTS

| 2006/0236366 A1* | 10/2006 | Walczyk | 726/1 |
| 2007/0024872 A1* | 2/2007 | Salgado | 358/1.1 |
| 2008/0079985 A1* | 4/2008 | Ferlitsch | 358/1.15 |
| 2010/0277774 A1* | 11/2010 | Reid et al. | 358/474 |

* cited by examiner

*Primary Examiner* — Satwant Singh
(74) *Attorney, Agent, or Firm* — Duft Bornsen & Fettig, LLP

(57) ABSTRACT

Systems and methods are disclosed for scan workflow processing to correctly and reliably generate a final output for a user. A workflow control service identifies capabilities of one or more devices for performing post processing steps defined in a scan workflow. An image scanner is utilized to scan a document to generate scanned document data. The workflow control service provides the post processing steps to the one or more of the devices based on the identified capabilities for each respective device. The devices then perform the post processing steps on the scanned document data to generate a final output. The workflow control service then transmits the output data to a device identified by the workflow to generate the final output.

11 Claims, 7 Drawing Sheets

FIG. 8
⟵ 800

```xml
<?xml version="1.0"?>
<psp:PostScanProcess xmlns:psp="http://schemas.microsoft.com/windows/2008/02/imaging/postscan/psp"
 xmlns:wscn="http://schemas.microsoft.com/windows/2006/08/wdp/scan">
    <psp:ScanRepository>wfms:controlsystem.test.net</psp:ScanRepository>
    <psp:ScanTicket>
        <wscn:JobDescription>
            <wscn:JobName>psp1</wscn:JobName>
            <wscn:JobOriginatingUserName>000000000028EF70</wscn:JobOriginatingUserName>
            <wscn:JobInformation/>
        </wscn:JobDescription>
        <wscn:DocumentParameters>
            <wscn:Format wscn:MustHonor="true">jpeg2k</wscn:Format>
            <wscn:MediaSides>
                <wscn:MediaFront>
                    <wscn:ColorProcessing wscn:MustHonor="true">RGB24</wscn:ColorProcessing>
                    <wscn:Resolution wscn:MustHonor="true">
                        <wscn:Width>300</wscn:Width>
                        <wscn:Height>300</wscn:Height>
                    </wscn:Resolution>
                </wscn:MediaFront>
            </wscn:MediaSides>
        </wscn:DocumentParameters>
    </psp:ScanTicket>
    <psp:PostScanInstructions>
        <psp:ContinueOnError>true</psp:ContinueOnError>
        <psp:DocumentRootName>Images</psp:DocumentRootName>
        <psp:FiltersToProcess>
            <psp:Filter>
                <psp:Dialect>http://schemas.example.com/postscan/filter/preview</psp:Dialect>
                <psp:Instructions>
                    <pre:PreviewConfig xmlns:pre="http://schemas.example.com/postscan/filter/preview">
                        <pre:Device pre:MustHonor="true">scanner1.test.net</pre:Device>
                        <pre:Scale>100</pre:Scale>
                        <pre:DisplayPage>1</pre:DisplayPage>
                    </pre:PreviewConfig>
                </psp:Instructions>
            </psp:Filter>
            <psp:Filter>
                <psp:Dialect>http://schemas.example.com/postscan/filter/ftp</psp:Dialect>
                <psp:Instructions>
                    <ftp:FTPConfig xmlns:ftp="http://schemas.example.com/postscan/filter/ftp">
                        <ftp:Device ftp:MustHonor="false">scanner2.test.net</ftp:Device>
                        <ftp:SaveToMySite>true</ftp:SaveToMySite>
                        <ftp:SaveToFTPURL>ftp://testscan.net/repository</ftp:SaveToFTPURL>
                    </ftp:FTPConfig>
                </psp:Instructions>
            </psp:Filter>
            <psp:Filter>
                <psp:Dialect>http://schemas.microsoft.com/windows/2007/10/imaging/postscan/filter/
                sharepoint</psp:Dialect>
                <psp:Instructions>
                    <shp:SharePointConfig xmlns:shp="http://schemas.microsoft.com/windows/2007/10/
                    imaging/postscan/filter/sharepoint">
                        <shp:SaveToMySite>false</shp:SaveToMySite>
                        <shp:SaveToSharePointSites>
                            <shp:SaveToSharePointSiteURL>http://testscan/site/scans
                            </shp:SaveToSharePointSiteURL>
                        </shp:SaveToSharePointSites>
                    </shp:SharePointConfig>
                </psp:Instructions>
            </psp:Filter>
        </psp:FiltersToProcess>
    </psp:PostScanInstructions>
</psp:PostScanProcess>
```

802 — ScanTicket block
803 — Preview Filter block
804 — FTP Filter block
805 — SharePoint Filter block

SCAN DATA WORKFLOW PROCESSING

BACKGROUND

1. Field of the Invention

The invention relates generally to scan data workflow processing, and more specifically, to methods and systems for identifying and utilizing post processing capabilities of devices to process a scan workflow and to generate a final output.

2. Discussion of Related Art

In a network environment, a number of devices exist for providing pre and post processing capabilities for users of the network. For example, some users may utilize the devices for scanning documents to generate scanned document data, while other users may perform color correction processing on the scanned document data before printing the corrected data on a color printer.

As the number of devices placed into service within the network environment changes over time, some newer devices may include capabilities not found on older devices. Thus, over time, a mixture of old and new devices in the network environment may lead to confusion by users about what capabilities a specific device actually has. For example, some devices may include Optical Character Recognition (OCR) functions, while other devices may not. Thus, over time, it may be difficult for a user to correctly identify specific devices which include the functionality sought after by the user for post processing of data.

When the devices are in operation within the network environment, a number of options exist for a user to access the devices to perform the desired pre and post processing activities. For example, some devices may include local displays providing various interfaces to internal services on the devices, such as a scan to an Adobe Portable Document Format (PDF) file service or a scan to a data file service. Other devices within the network environment may be more limited, and instead require a user to run software on a computer to access the capabilities of the devices.

Regardless of how a user may access any specific device, the user may wish to perform a number of post processing steps on data which may or may not be present at any one device. For example, if a user of a device wishes to scan a document to a PDF file, the user may be required to identify a particular device which includes both the scanning functionality and the PDF generation functionality in order to generate a desired final output of the document. When any one device does not include all the desired post processing functionality, a user may be required to transfer some intermediate format data from the device to a computer for post processing. This may only be available to a user, however, when the user has access to a computer which includes the desired post processing functionality.

After the user generates the scan data and performs a number of post processing steps on the scan data, the user may wish to provide the post processing output to a particular destination, such as an email address or a network location. In a manner similar to post processing, various destinations may or may not be available based on the specific device the user is operating. For example, a user may be scanning and post processing data on a device which only supports the destination capability of a network location. The user may desire, however, that the final output be placed on a memory card, such as a USB flash drive. In order to receive the final output on the USB flash drive, the user may be required to transfer the data to a computer and manually place the data on the USB flash drive to generate the desired final output.

In some cases, an administrator may wish to restrict specific users or groups of users to certain functions, services, and/or destinations for the final output of the scan data. This type of restriction is not easily accomplished in the present technology.

Thus it is an ongoing challenge to identify and utilize the capabilities of various devices to process an entire scan workflow and to correctly and reliably generate a final output for a user.

SUMMARY

The present invention solves the above and other problems, thereby advancing the state of the useful arts, by providing systems and methods for scan workflow processing to correctly and reliably generate a final output for a user.

One aspect hereof provides a method for workflow processing of scanned document data to generate a final output. According to the method, capabilities of one or more devices are identified, where the one or more devices includes an image scanner. A workflow defining post processing steps for generating a final output of scanned document data is received. A document is scanned on the image scanner to generate scanned document data. The scanned document data is processed using the post processing steps of the workflow to generate output data, where the processing includes providing the post processing steps to the one or more devices based on the identified capabilities. The output data is transmitted to the one or more devices identified by the workflow to generate the final output.

Another aspect hereof provides for a workflow system. The workflow system is operable to process a workflow of scanned document data to generate a final output. The workflow system includes a workflow control service operating on a computing device. A memory of the computing device is communicatively coupled with the workflow control service and is operable to store a workflow defining post processing steps for generating the final output of scanned document data. The workflow control system further includes one or more devices communicatively coupled with the workflow control service, where the one or more devices include an image scanner. The image scanner is operable to scan a document to generate the scanned document data. The workflow control service is further operable to receive the workflow from the memory, is further operable to identify capabilities of the one or more devices, and is further operable to provide the post processing steps to the one or more devices based on the identified capabilities. The one or more devices are operable to process the scanned document data based on the received post processing steps to generate the output data. The workflow control service is further operable to transmit the output data to one or more of the devices identified by the workflow to generate the final output.

BRIEF DESCRIPTION OF THE DRAWINGS

The same reference number represents the same element or same type of element on all drawings.

FIG. 8 is an exemplary scan workflow described in an XML Post Scan Processing (PSP) format.

DETAILED DESCRIPTION OF THE DRAWINGS

FIGS. 1 through 8 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
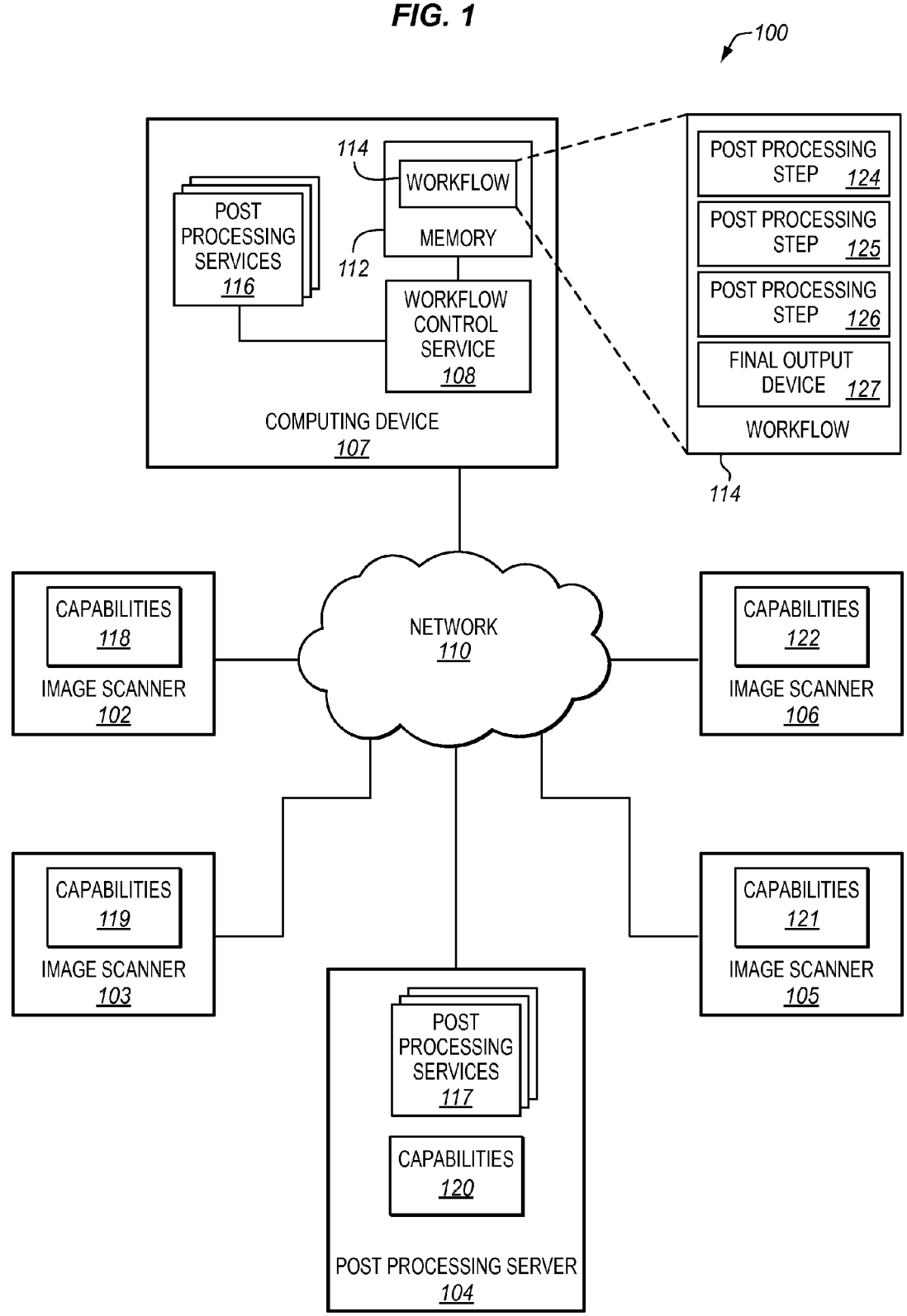
FIG. 1 is a block diagram of an exemplary workflow system in an embodiment of the invention.

FIG. 1 is a block diagram of an exemplary workflow system 100 in an embodiment of the invention. The workflow system 100 includes a computing device 107 operating a workflow control service 108 and one or more devices 102-106 coupled with the computing device 107 through a network 110. The network 110 operates to transfer data between the devices 102-107. The computing device 107 also includes a memory 112, which stores a workflow 114. The devices 102-106 include an image scanner, such as an image scanner 102. The workflow 114 defines post processing steps 124-126 for generating output data based on scanned document data, and also indicates a final output device 127 which generates the final output. For example, the workflow 114 may include a series of data processes to perform on the scanned document data, such as a color conversion process, a de-skew process, and an OCR process. Also, the final output device 127 in the workflow 114 may be used to indicate the specific device to generate the final output. Thus, the workflow 114 defines the sequence of processing steps to perform on scanned data generated from an image scanner (e.g., image scanner 102), to generate a final output.

When the workflow system 100 is in operation, the workflow control service 108 receives the workflow 114 and identifies the capabilities 118-122 of the devices 102-106. Scanned document data is generated on an image scanner, such as image scanner 102. The workflow control service 108 provides one or more of the devices 102-106 the post processing steps 124-126 based on the respective capabilities 118-122 corresponding to of each of the devices 102-106. The output data is generated based on the scanned document data and the post processing steps 124-126. The workflow control service 108 then transmits the output data to one of the devices 102-106 identified as the final output device 127 in the workflow 114 to generate the final output.

In some embodiments, the workflow system 100 includes a number of other optional devices, such as a post processing server 104. The post processing server 104 operates to provide various post processing services 117 to the workflow system 100. In some cases, the post processing server 104 may operate to provide additional services which may not be found within the devices 102-103, and 105-106. In other cases, the post processing server 104 may be more suitable for providing some post processing services than other devices 102-103, and 105-106 within the workflow system 100, such as when the post processing server 104 operates faster when performing the services.

In other embodiments, the computing device 107 may include various post processing services 116 coupled with the workflow control service 108. Thus, in the other embodiments, the workflow control service 108 may utilize the post processing services 116 when performing the post processing steps 124-126. The utilization of the post processing services 116 may be performed in addition to, or in replacement of, services provided by the devices 102-106. For example, the utilization of the post processing services 116 may be the result of none of the devices 102-106 having a post processing service identified in the post processing steps 124-126 of the workflow 114. In like manner to the post processing server 104, the workflow control service 108 may utilize the post processing services 116 in cases where it may be more suitable for providing some services than the devices 102-106 within the workflow system 100.

Further details of the operation of the workflow system 100 will be described by way of an example. In the workflow system 100, the image scanner 102 includes various post processing services for scanning and processing data. For example, the image scanner 102 may operate to scan documents at specific resolutions, a color space, or color bit depths to generate the scanned document data. The image scanner 102 may also include various post processing capabilities 118, such as generating a PDF file, performing an OCR process, or other such post processing capabilities. Thus, when the workflow control service 108 identifies the capabilities 118 for the image scanner 102, the unique post processing services and scan capabilities specific to the image scanner 102 are identified.

In our example, we will consider that the workflow 114 defines a color correction process in post processing step 124, a de-skew process in post processing step 125, and a OCR process in post processing step 126. We will also consider that the workflow 114 indicates that the final output device 127 is the post processing server 104. In order to generate the final output, the workflow 114 indicates that the post processing server 104 uploads the result of the post processing steps 124-126 to an FTP server. When a user wishes to utilize the workflow system 100 to process the workflow 114, the user may first scan a document on an image scanner, to generate scanned document data. When processing the workflow 114, the workflow control service 108 provides the various post processing steps 124-126 defined in the workflow 114 to the devices 102-106 based on the capabilities 118-122 to generate the output data. If, for example, the capabilities 118 of the image scanner 102 indicates a capability for performing the color correction process, that the capabilities 119 of the image scanner 103 indicates a capability for performing the de-skew process, and that the capabilities 122 of the multi-function printer 106 indicates a capability for performing the OCR process, then the workflow control service 108 provides the post processing step 124 to the image scanner 102, provides the post processing step 125 to the image scanner 103, and provides the post processing step 126 to the multi-function printer 106 to generate the output data.

In some embodiments, the workflow control service 108 may optimize the workflow 114 for enhanced post processing performance. For example, some steps of the workflow 114 may be performed in parallel for enhanced performance or in a different sequence based on the capabilities 118-122 of the devices 102-106. A specific device may be selected over other devices when the specific device can perform a larger number of steps of the workflow 114 than other devices. This activity operates to reduce intermediate post processing data transfers across the network of devices, which improves performance. While a number of devices may include similar capabilities when performing post processing, some devices may be more suitable than others for performing specific post processing steps.

In other embodiments, the workflow control service 108 may identify a status of the devices 102-106 and utilize the status information to determine which of the devices 102-106 to utilize for various post processing activities. For example, some devices may indicate a busy status or an out of service status. Thus, the workflow control service 108 may elect to select a different device for performing the various post processing steps.

When the image scanners 102-103 and the multi-function printer 106 receive the post processing steps 124-126 in the example workflow 114, the image scanners 102-103 and the multi-function printer 106 operate to generate the output data by processing the scanned document data based on the respective post processing steps 124-126. Therefore, the image scanner 102 operates to perform the color correction process based on the scanned document data, the image scanner 103 operates to perform the de-skew process based on the scanned document data, and the multi-function printer 106 operates to perform the OCR process based on the scanned document data.

For example, the image scanner 102 first processes the scanned document data to generate some intermediate output, and then transmits the intermediate output to the workflow control service 108 for subsequent processing. The workflow control service 108 transmits the received intermediate output to the scanner 103 for de-skew processing. In like manner, the workflow control system 108 receives the result of the de-skew processing from the scanner 103, and then transmits the result of the de-skew processing to the multi-function printer 106 for the OCR processing and to generate the output data. After the workflow control service 108 receives the output data from the multi-function printer, the workflow control service 108 transmits the output data to the post processing server 104. The post processing server 104 uploads the output data to an FTP destination location indicated in the workflow 114 to generate the final output.

Along with identifying the capabilities 118-122 of the devices 102-106 within the workflow system 100, the workflow control service 108 also operates to identify various scan settings, post processing capabilities, and destination capabilities of the devices 102-106 for providing a destination for the output data. For example, the image scanner 102 may include a hard disk drive or a solid state memory card slot. Therefore, a destination capability for the image scanner 102 may be to write the output data to the hard drive or a solid state memory card to generate a final output. In a manner similar to post processing services, the devices 102-107 within the workflow system 100 may include different destination location capabilities. For example, the multi-function printer 106 may include a FTP capability. The FTP capability would allow the multi-function printer 106 to provide the output data to an FTP location. The multi-function printer 106 may also include other destination capabilities, such as a network location destination using Server Message Block (SMB) protocol or a network location destination using NetWare Core Protocol (NCP). Although the devices 102-107 within the workflow system 100 have been described with respect to various post processing and destination location capabilities, one skilled in the art will recognize that such capabilities may be available on any of the devices 102-107 which are part of the workflow system 100. The flexibility of the workflow control service 108 for identifying various post processing and destination capabilities of the devices 102-106 within the workflow system 100 will be illustrated further with respect to FIG. 2.

Figure 2:
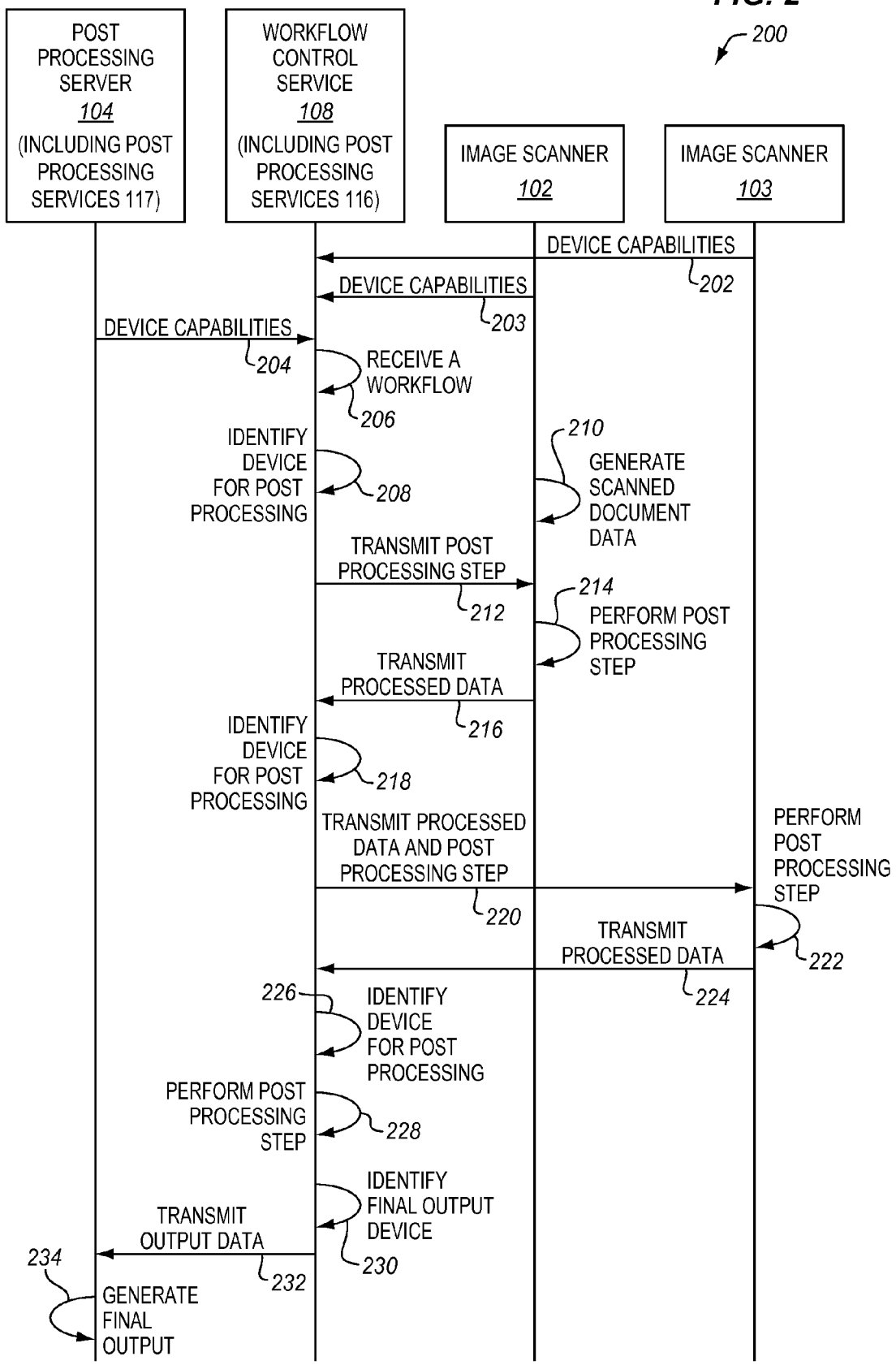
FIG. 2 illustrates an exemplary communication and processing sequence for the system of FIG. 1.

FIG. 2 illustrates an exemplary communication and processing sequence 200 for the system of FIG. 1 in an embodiment of the invention. In FIG. 2, specific devices within the workflow system 100 will be described to enable one skilled in the art to more clearly understand the flexibility provided by the workflow control service 108 in processing the workflow 114 to generate a final output data for a scanned document.

The communication and processing sequence 200 illustrates various sequences which may occur between the image scanners 102-103, the workflow control service 108, and the post processing server 104 when processing the workflow 114 to generate the final output data. In the communication and processing sequence 200, the workflow control service 108 receives in sequences 202-204 the device capabilities from the image scanner 103, the image scanner 102, and the post processing server 104 respectively. Specifically for this example, we will consider that the image scanner 103 identifies a de-skew processing capability, that the image scanner 102 identifies a color correction processing capability, and that the post processing server 104 identifies an FTP destination location capability to the workflow control service 108.

In sequence 206, the workflow 114 is received by the workflow control service 108. For this example, we will consider that the workflow 114 defines a color conversion process in post processing step 124, a de-skew process in post processing step 125, an OCR process in post processing step 126, and that the post processing server 104 is the final output device 127 (See FIG. 1).

In sequence 208, the workflow control service 108 identifies a device for performing the color conversion process. Based on the device capabilities received in sequences 202-204, the workflow control service 108 identifies the image scanner 102 as be able to perform the color conversion process.

In sequence 210, a document is scanned on the image scanner 102 to generate scanned document data. In sequence 212, the workflow control service 108 instructs the image scanner 102 to perform the color conversion process.

In sequence 214, the image scanner 102 performs the color conversion process on the scanned document data. In sequence 216, the image scanner 102 transmits the processed scanned document data to the workflow control service 108.

In sequence 218, the workflow control service 108 identifies a device for performing the de-skew process. Based on the device capabilities received in sequences 202-204, the workflow control service 108 identifies the image scanner 103 as be able to perform the de-skew process.

In sequence 220, the workflow control service 108 transmits the processed data to the image scanner 103, and instructs the image scanner 103 to perform the de-skew process. In sequence 222, the image scanner 103 performs the de-skew process on the data received in sequence 220.

In sequence 224, the image scanner 103 transmits the processed data to the workflow control service 108. In sequence 226, the workflow control service identifies a device for performing the OCR post processing step. In this example, none of the device capabilities identified in sequences 202-204 indicates a device that is able to perform this process. In this case, the workflow control service 108 identifies an OCR post processing capability available by the post processing services 116 coupled with the workflow control service 108.

In sequence 228, the workflow control service 108 performs the OCR process on the data to generate the output data. In sequence 230, the workflow control service 106 identifies the final output device from the workflow 114 as the post processing server 104. In sequence 232, the workflow control service 108 transmits the output data to the post processing server 104.

In sequence 234, the post processing server generates the final output for the workflow 114 by uploading the output data to an FTP location as indicated by the workflow 114.

Figure 6:
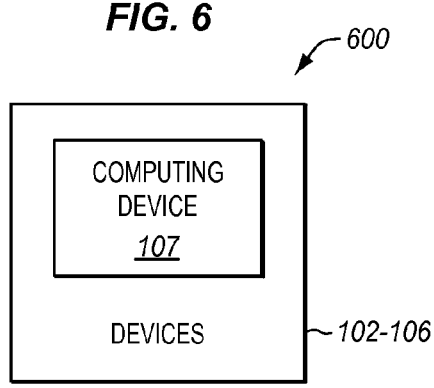
FIG. 6 is block diagram of an exemplary workflow system in an embodiment of the invention.

FIG. 6 illustrates an alternate embodiment of the workflow system 100. In FIG. 6, the computing device 107 of FIG. 1 resides within one of the devices 102-106. In the alternate embodiment, one of the devices 102-106 therefore includes the workflow control service 108, the memory 112 including the workflow 114, and the post processing services 116. Correspondingly, one of the devices 102-106 operates to perform all the functionality described with respect to the workflow control service 108 of FIG. 1.

Although the workflow systems of FIGS. 1 and 6 have been described with respect to functionality applied to specific elements, one skilled in the art will recognize that the described functionality may be embodied in more or fewer elements as a matter of design choice. One skilled in the art will also recognize that various implementations of the described functionality may be embodied by any number of electronic circuits, electronic devices, servers, processors, electronic memory devices, and/or programmable logic devices in various configurations to implement the functionality described herein. One skilled in the art will also recognize that the sequences illustrated in FIG. 2 may include more or fewer sequences and/or may include the illustrated sequences in a different order as a matter of design choice.

Figure 3:
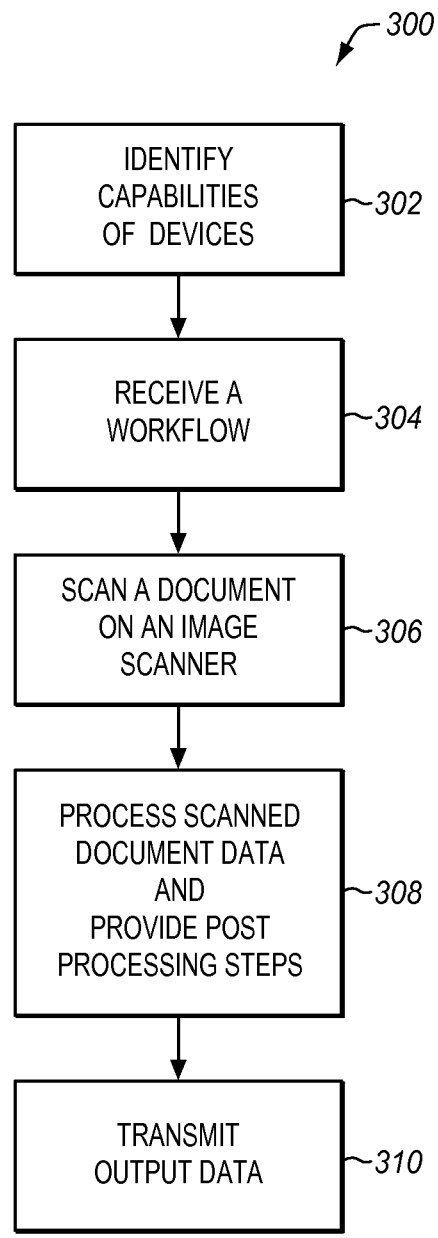
FIG. 3 is a flowchart depicting an exemplary method for workflow processing in an embodiment of the invention.

FIG. 3 is a flowchart depicting an exemplary method 300 for workflow processing in an embodiment of the invention. The steps of FIG. 3 will be described with respect to an example of workflow processing using an image scanner including the computing device 107 of FIG. 1 and one or more devices coupled with the image scanner in a network environment. In our example, a user approaches the image scanner and indicates that workflow processing is about to begin. The user places a document on the image scanner for scanning, and selects a workflow on a display of the image scanner for processing the document. Additionally, the user may select the workflow using a web browser or a remote user interface.

In step 302 of method 300, the workflow control service within the scanner identifies the capabilities of the devices, where the devices include an image scanner. In some embodiments, the capabilities of the devices may be identified by the workflow control service using a Web Services on Devices (WSD) protocol. In other embodiments, the devices may be identified by the workflow control service using one or more Hypertext Transfer Protocol (HTTP) requests, Simple Network Management Protocol (SNMP) requests, or other type of requests. In additional embodiments, an administrator may input some or all capabilities if such information cannot be identified by the workflow control service.

In step 304, the workflow control service receives a workflow defining post processing steps for generating the final output of scanned document data. In some embodiments, the right for the workflow control service to receive the workflow may be defined based on a specific user or group that the user operating the scanner belongs to. For example, the user may be authenticated by a directory service and be given access to various workflows within the directory service based on the user ID or the group ID that the user belongs to. Correspondingly, the directory service may transmit the workflow to the workflow control service in response to the user selecting a specific workflow.

In step 304, the workflow control service receives the workflow selected by the user from the directory service. In some embodiments, the workflow control service may optimize the workflow for enhanced post processing performance. For example, some steps of the workflow may be performed in parallel for enhanced performance or in a different sequence based on the capabilities of the devices. While a number of devices may include similar capabilities when performing post processing, some devices may be more suitable than others for performing specific post processing steps.

In step 306, the user initiates scanning of a document to generate scanned document data. The scanner performs the scan process based on the specific scan settings within the workflow.

In step 308, the scanner processes the scanned document data based on the post processing steps to generate output data. In some embodiments, the scanner may not include all the post processing functionality defined in the workflow. Therefore, the workflow control service may provide the post processing steps to other devices based on the capabilities identified in step 302. Additional exemplary details of step 308 will be discussed in FIG. 4.

In step 310 of FIG. 3, the workflow control service transmits the output data resulting from performing step 308 to one or more of the devices identified in the workflow to generate the final output. For example, the workflow control service within the scanner may transmit the output data to a multi-function printer for uploading the output data to an FTP location.

Figure 4:
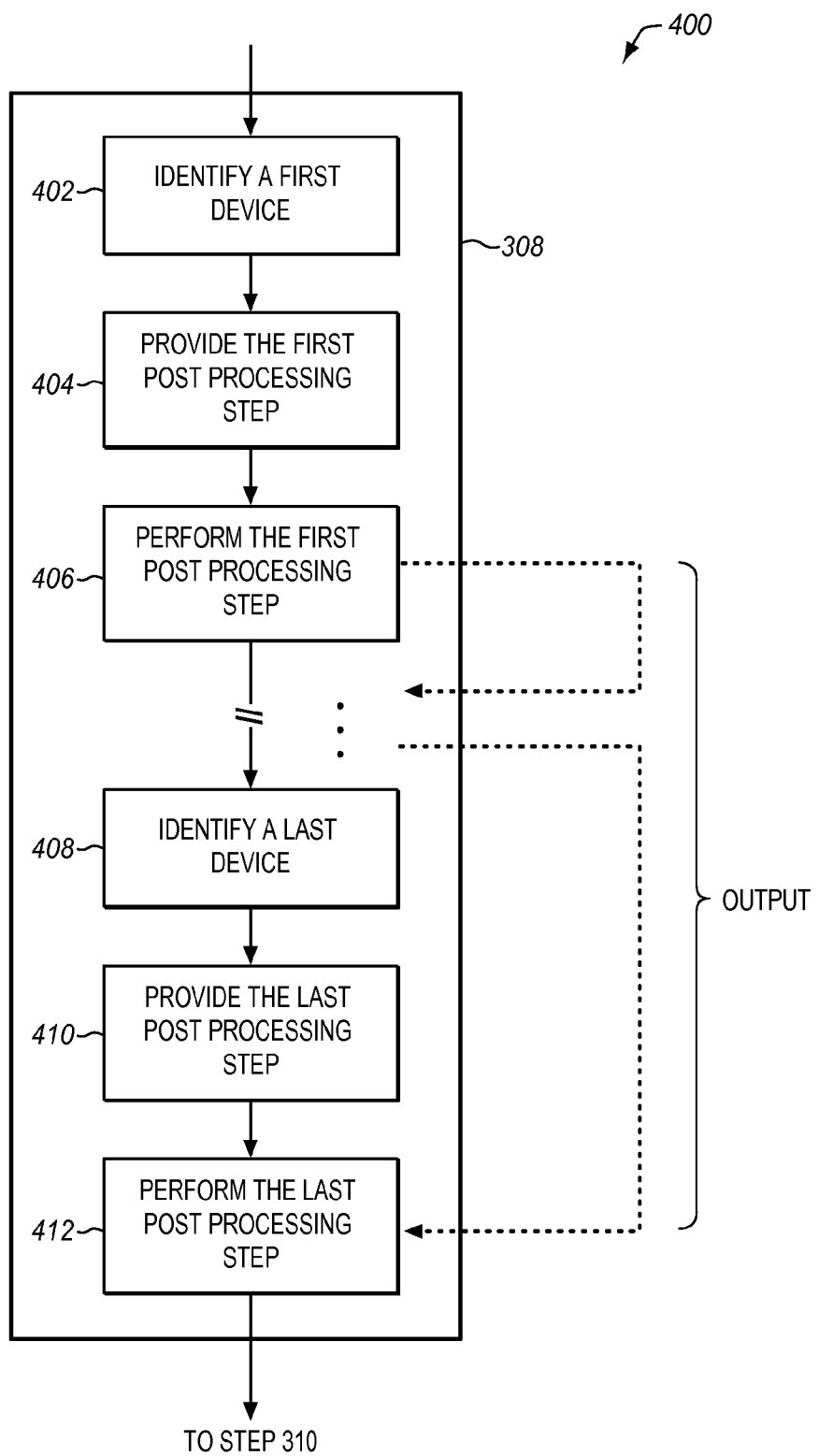
FIG. 4 is a flowchart depicting exemplary additional details of the method of FIG. 3.

FIG. 4 is a flowchart depicting exemplary additional details for step 308 of method 300.

In step 402, the workflow control system identifies a first device based on the identified capabilities of step 302 which is capable of performing a first post processing step of the workflow. In some embodiments the first device is the image scanner operating the workflow control service.

In step 404, the workflow control service provides the first post processing step to the first device. After the workflow control service identifies the first device in step 402, the workflow control service instructs the first device to perform the first post processing step. In step 406, the first device performs the first post processing step to generate an intermediate output from the scanned document data.

In step 408, the workflow control service identifies a last device based on the identified capabilities of step 302, where the last device is capable of performing the last post processing step. In some embodiments, the last device and the first device are the same device. In other embodiments, a plurality of devices between the first device and the last device are utilized to perform the post processing services.

In step 410, the workflow control system provides the last post processing step to the last device. After the workflow control service identifies the last device in step 408, the workflow control service instructs the last device to perform the last post processing step. In step 412, the last device performs the last post processing step on the intermediate data from the previous post processing steps to generate output data. Step 310 of FIG. 3 is performed after the output data is generated in step 412.

Figure 5:
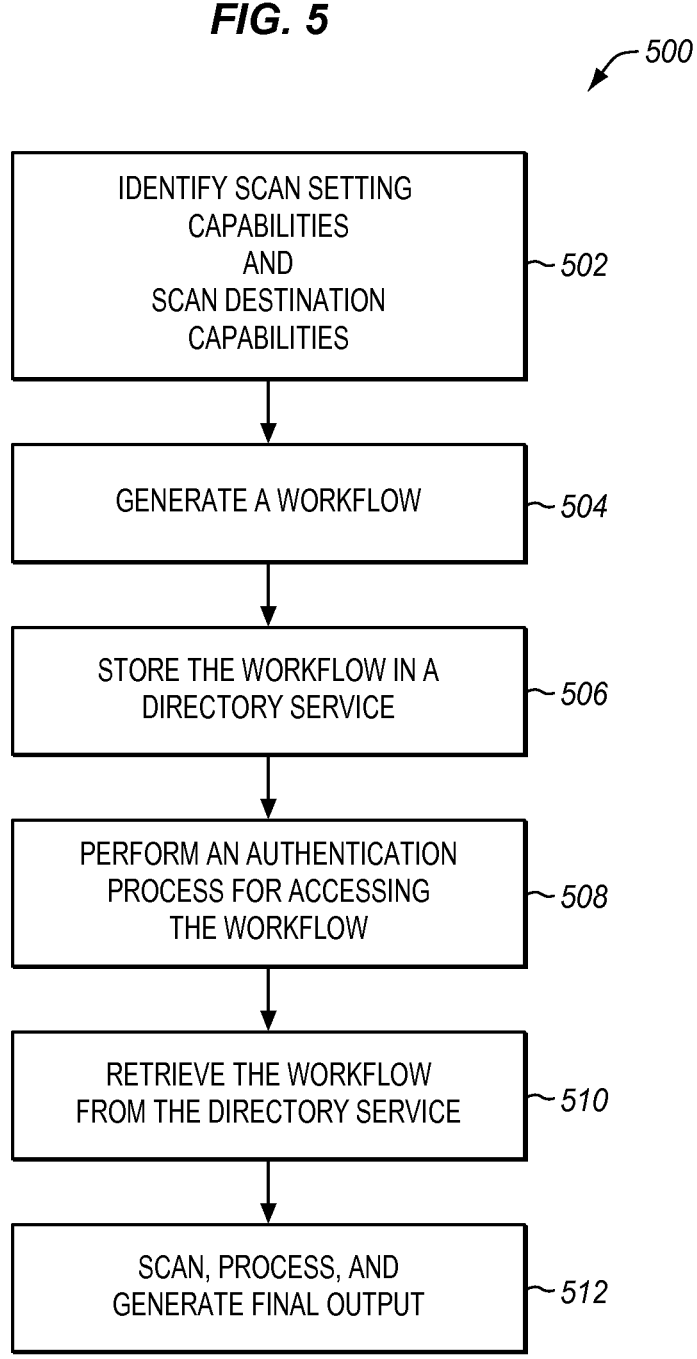
FIG. 5 is a flowchart depicting another exemplary method for workflow processing in an embodiment of the invention.

FIG. 5 is a flowchart depicting another exemplary method 500 for workflow processing in an embodiment of the invention. The steps of FIG. 5 will be described with respect to an example of workflow processing using an image scanner including the computing device 107 of FIG. 1 and one or more devices coupled with the image scanner in a network environment.

In step 502, a workflow control service identifies scan setting capabilities, post processing capabilities, and output destination capabilities of the one or more devices. For example, the workflow control service may query the devices to identify scanning capabilities, such as a color space, a color depth, a resolution, and the like. The workflow control service may also identify various output destination capabilities for the devices, such as FTP location options, network location options, memory card location options, etc.

In step 504, the workflow control service generates a workflow defining post processing steps for the final output of scanned document data, where the workflow is based on the identified capabilities of step 502. In some embodiments, an administrator may wish to utilize the workflow control service to generate a scan workflow. When generating the workflow, the administrator may first identify one or more steps of the workflow, and then utilize the workflow control service to identify the devices which are able to perform the post processing steps of the workflow. When the workflow control service generates the workflow, it utilizes the identified capabilities from step 502 to initially assign one or more devices to perform the post processing steps in the workflow. For example, the workflow may indicate that three devices have been identified to perform the first post processing step in the workflow. Thus, the workflow may list a primary, a secondary, and a tertiary device for performing the first post processing step.

In some embodiments, the workflow control service may optimize the workflow for enhanced post processing performance. For example, some steps of the workflow may be performed in parallel for enhanced performance or in a different sequence based on the capabilities of the devices. While a number of devices may include similar capabilities when performing post processing, some devices may be more suitable than others for performing specific post processing steps.

In step 506, the workflow control service stores the workflow in a directory service. In some embodiments, the administrator may utilize the workflow control service to assign rights for accessing the workflow. For example, some users or groups of users may be allowed to access the workflow while others may not. The workflow may be tailored specifically to a particular department, such as a legal department in an office setting. Thus, the workflow may be restricted for access to all users or to particular users within the legal department.

In step 508 the workflow control service contacts the directory service to perform an authentication process for accessing the workflow. A user may, for example, enter authentication information on a display of the image scanner for selecting a desired workflow. The workflow control service may then forward the authentication information and the selected workflow information to the directory service for processing the request.

In step 510, the workflow control service retrieves the selected workflow steps from the directory service in response to a user being authenticated for accessing the workflow.

In step 512, the scanner operates to generate scanned document data from a document. In some embodiments, the user may be instructed to place the document on the scanner and indicate to the workflow control service that workflow processing should commence. After the scanned document data is generated by the scanner, the workflow control service processes and generates the final output of the workflow in a manner similar to the embodiments of FIGS. 1-4, and FIG. 6.

Although the method 300 and the method 500 of FIGS. 3-5 have been described with respect to specific steps, one skilled in the art will recognize that more or fewer steps may be utilized to perform the functionality described herein. Also, one skilled in the art will recognize that the method 300 and the method 500 may be performed by the workflow systems of FIGS. 1 and 6, or other systems suitable for performing the functionality described, or may be embodied as programmed instructions stored on a computer readable medium and executable by a processing system.

Figure 7:
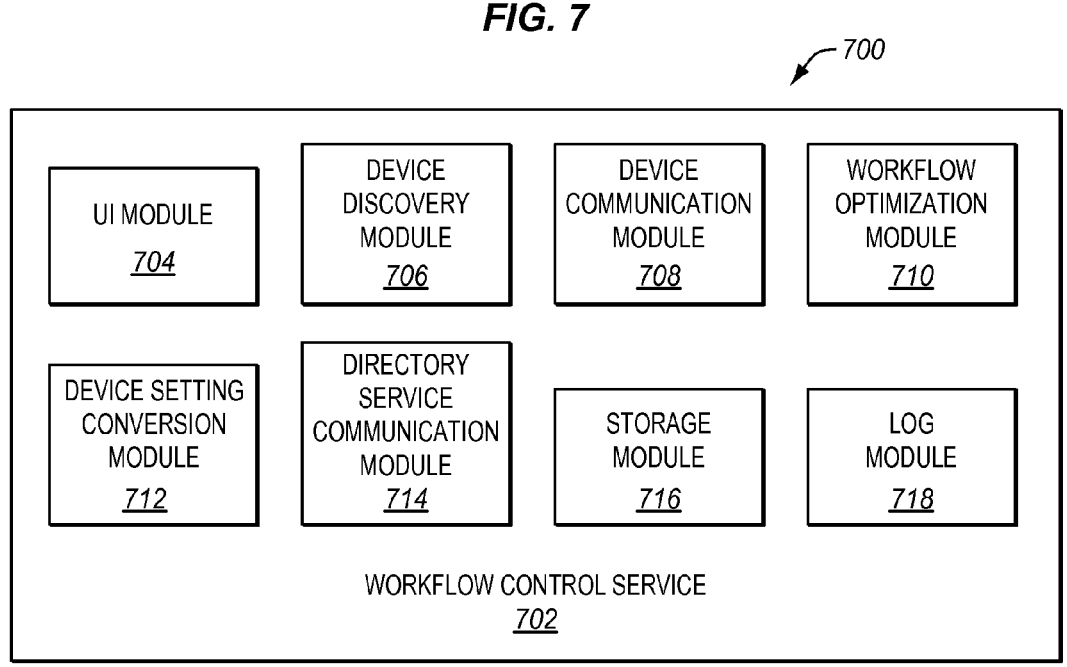
FIG. 7 is a block diagram of an exemplary modular decomposition of a workflow control service in an embodiment of the invention.

FIG. 7 is a block diagram of an exemplary modular decomposition of a workflow control service in an embodiment of the invention. The workflow control service 702 of FIG. 7 in this embodiment includes a number of modules for performing various functions, such as User Interface (UI) module 704. UI module 704, operates to interface with a user for interacting with the workflow control service 702. For example, a user may utilize the UI module 704 to select a specific workflow for processing scanned document data.

The workflow control service 702 also includes device discovery module 706 and a device communication module 708. The device discovery module 706 operates to discover various devices available to the workflow control service 702 for workflow processing. For example, the device discovery module 706 may identify specific devices such as scanners, printers, facsimile machines, etc. After the device discovery module 706 identifies the various devices, the device communication module 708 operates to query the various devices to identify the capabilities of the devices for performing post processing, physical scanning, and accessing destination locations. The device communication module 708 also subscribes for device capabilities and device/job status change events, to provide the workflow optimization module 710 with real-time device/job information. The real-time information allows the workflow optimization module 710 to select the most appropriate device for specific workflow steps. For example, during post processing of data, status of a device performing a specific post processing step may change in real time (e.g., a device may go off-line during while post processing data). In this case, the workflow optimization module 710 would receive a real-time update of a change in status for the device. This change in status would indicate to the workflow optimization module 710 to identify a different device in real-time to perform the post processing step previously assigned to the now off-line device. This activity allows the workflow optimization module to dynamically adjust the post processing step assignments in real time, which increases the performance of the workflow control service 702.

The workflow control service 702 also includes a directory service communication module 714 and a workflow optimization module 710. The directory service communication module 714 operates to query a directory service to retrieve a workflow, such as a workflow selected by a user operating the UI module 704. The workflow optimization module 710 may be utilized to optimize the received workflow, such as re-ordering steps of the workflow and/or implementing the workflow in a parallel manner among the various devices discovered by the device discovery module 706 to improve the post processing performance.

The workflow control service 702 also includes a device setting conversion module 712, a storage module 716, and a log module 718. The device setting conversion module 712 operates to convert any user specified scan setting and any post scan processing instructions into a PSP format. For example, a user may enter scan settings of 600 dpi, a colorspace of RGB24, and a final output in PDF format using the UI module 704. In this case, the conversion module 712 will convert the settings and instructions into a PSP format, such as an exemplary PSP decomposition indicated below (the complete PSP shown here in part for scan settings):

```
<wscn:DocumentParameters>
xmlns:wscn="http://schemas.microsoft.com/windows/2006/08/wdp/scan">
    <wscn:Format>pdf-a</wscn:Format>
    <wscn:MediaSides>
        <wscn:MediaFront>
            <wscn:ColorProcessing>RGB24</wscn:ColorProcessing>
            <wscn:Resolution>
                <wscn:Width>600</wscn:Width>
                <wscn:Height>600</wscn:Height>
            </wscn:Resolution>
        </wscn:MediaFront>
    </wscn:MediaSides>
</wscn:DocumentParameters>
```

The storage module 716 operates to store any intermediate post processing output, final post processing output, or a workflow received from the directory service communication module 714. Also, the storage module 716 operates to store created and/or customized workflows if the directory service is not available. In addition, the storage module 716 operates to cache device capability information for improved performance. For example, various devices may generate intermediate output when the workflow is being processed. The intermediate output may be stored in the storage module 716 before being forwarded to additional devices for further post processing. After the post processing is complete, the storage module may store the output from the workflow processing steps. The log module 718 operates to log and record various activities during the operation of the various modules of the workflow control service 702. For example, any errors generated during the workflow processing may be logged by the log module 718. In addition, the log module 718 may also record the successful processing of various steps of the workflow or that the workflow has completed.

Although the workflow control service 702 of FIG. 7 has been described using specific modules, one skilled in the art will recognize that the modules may be combined or decomposed into other embodiments as a matter of design choice.

FIG. 8 is an exemplary scan workflow 800 described in an XML PSP format. The scan workflow 800 includes various instructions for generating scan data and performing post processing of the scan data. In some embodiments, the scan workflow 800 is processed by the various workflow control services of FIGS. 1, 6, and 7 for generating a final output.

Section 802 of FIG. 8 includes instructions for a scan job, including the scan format (e.g., jpeg2k), the scan colorspace (e.g., RGB24), and the scan resolution (e.g., 300×300). Sections 803-805 include instructions for various post processing and destination location steps, such as a preview step in section 803, a FTP step in section 804, and a save to sharepoint step in section 805. The preview step of section 803 includes instructions such as 'MustHonor=true' and provides a specific device of 'scanner1.test.net' to perform the preview step. This indicates to a workflow control service that the preview step must be performed by the specific 'scanner1.test.net' device.

Section 804 includes various FTP step instructions for identifying a destination location such as 'MustHonor=false'. In this example section, the specific device of 'scanner2.test.net' is not required to be utilized for performing the FTP processing step. For example, 'scanner2.test.net' may be unavailable or busy performing other post processing steps. In this case, the workflow control service may choose a different device to perform this functionality.

Section 804 also includes instructions for an FTP location for the data, specified by the '<SaveToFTPURL>ftp://testscan.net/repository' information. In this case, the data will be uploaded via FTP to 'ftp://testscan.net/repository'.

The sharepoint step of section 805 includes various instructions for uploading data to a sharepoint server. When a workflow control service implements the instructions of section 805, data may be uploaded to a sharepoint URL listed in the section as 'http://testscan/site/scans'.

Although specific embodiments were described herein, the scope of the invention is not limited to those specific embodiments. The scope of the invention is defined by the following claims and any equivalents thereof.

What is claimed is:

1. A method comprising:
identifying capabilities of a plurality of image scanners;
identifying scanned document data from an image scanner;
receiving a workflow defining post processing steps for generating a final output of the scanned document data;
identifying a first image scanner based on the identified capabilities that is operable to perform a first post processing step of the workflow;
providing the scanned document data to the first image scanner;
instructing the first image scanner to perform the first post processing step to generate intermediate output data from the scanned document data;
identifying a last image scanner based on the identified capabilities that is operable to perform a last post processing step of the workflow;
providing the intermediate output data to the last image scanner; and
instructing the last image scanner to perform the last post processing step to generate the final output from the intermediate output data.

2. The method of claim 1 wherein the post processing steps comprise at least one of:
a color conversion process,
a de-skew process,
an optical character recognition process,
an encryption process, or
a portable document format creation process.

3. The method of claim 1 further comprising:
identifying destination location capabilities of the image scanners, wherein the destination location capabilities includes at least one of:
a File Transfer Protocol location,
a hard disk within the image scanner,
a solid state memory card communicatively coupled with the image scanner,
an email,
a facsimile,
a network location using Server Message Block protocol, or a network location using Netware Core Protocol;
identifying a destination location from the workflow;
identifying an image scanner that is operable to provide the final output to the identified destination location based on the identified destination location capabilities; and
transmitting the intermediate output data to the identified image scanner to generate the final output.

4. The method of claim 1 further comprising:
providing the scanned document data to a plurality of image scanners for performing a post processing step in parallel.

5. A system comprising:
a control unit operable to identify scanned document data from an image scanner of a plurality of image scanners; and
a memory operable to store a workflow defining post processing steps for generating a final output of the scanned document data;
the control unit operable to identify capabilities of the image scanners, to identify a first image scanner based on the identified capabilities that is operable to perform a first post processing step of the workflow, to provide the scanned document data to the first image scanner, and to instruct the first image scanner to perform the first post processing step to generate intermediate output data from the scanned document data;
the control unit further operable to identify a last image scanner based on the identified capabilities that is operable to perform a last post processing step of the workflow, to provide the intermediate output data to the last image scanner, and to instruct the last image scanner to perform the last post processing step to generate the final output from the intermediate output data.

6. The system of claim 5 wherein the post processing steps comprising at least one of:
a color conversion process,
a de-skew process,
an optical character recognition process,
an encryption process, or
a portable document format creation process.

7. The system of claim 5 wherein the control unit is further operable to identify destination location capabilities of the image scanners, wherein the destination location capabilities includes at least one of:
a File Transfer Protocol location,
a hard disk within the image scanner,
a solid state memory card coupled with the image scanner,
an email,
a facsimile,
a network location using Server Message Block protocol, or
a network location using Netware Core Protocol,
wherein the control system is further operable to identify a destination location from the workflow, and to identify an image scanner that is operable to provide the final output to the identified destination location based on the identified destination location capabilities, and
wherein the control system is further operable to transmit the intermediate output data to the identified image scanner to generate the final output.

8. A non-transitory computer readable medium operable to store programmed instructions which, when executed by a processor, direct the processor to:
identify capabilities of a plurality of image scanners;
identify scanned document data from an image scanner;
receive a workflow defining post processing steps for generating a final output of the scanned document data;
identify a first image scanner based on the identified capabilities that is operable to perform a first post processing step of the workflow;
provide the scanned document data to the first image scanner;
instruct the first image scanner to perform the first post processing step to generate intermediate output data from the scanned document data;
identify a last image scanner based on the identified capabilities that is operable to perform a last post processing step of the workflow;
provide the intermediate output data to the last image scanner; and
instruct the last image scanner to perform the last post processing step to generate the final output from the intermediate output data.

9. The non-transitory computer readable medium of claim 8, wherein the post processing steps comprise at least one of:
a color conversion process,
a de-skew process,
an optical character recognition process,
an encryption process, or
a portable document format creation process.

10. The non-transitory computer readable medium of claim 8 wherein the instructions further direct the processor to:
identify destination location capabilities of the image scanners, wherein the destination location capabilities includes at least one of:
a File Transfer Protocol location,
a hard disk within the image scanner,
a solid state memory card communicatively coupled with the image scanner,
an email,
a facsimile,
a network location using Server Message Block protocol, or
a network location using Netware Core Protocol;
identify a destination location from the workflow;
identify an image scanner that is operable to provide the final output to the identified destination location based on the identified destination location capabilities; and
transmit the intermediate output data to the identified image scanner to generate the final output.

11. The non-transitory computer readable medium of claim 8, wherein the instructions further direct the processor to:
provide the scanned document data to a plurality of image scanners for performing a post processing step in parallel.

* * * * *